United States Patent
Sievers et al.

(10) Patent No.: US 8,726,968 B2
(45) Date of Patent: May 20, 2014

(54) WINDOW SHADE ASSEMBLY

(75) Inventors: Thomas J. Sievers, Laguna Niguel, CA (US); Morteza Yadollahi, Irvine, CA (US); John F. Leary, Yorba Linda, CA (US); Darrell L. James, Corona, CA (US); Marek S. Brzeski, Long Beach, CA (US); Elmon D. Sotto, Montebello, CA (US); John Edward Cheever, Huntington Beach, CA (US)

(73) Assignee: Adams Rite Aerospace, Inc. (CA Corp.), Fullerton, CA (US)

( * ) Notice: Subject to any disclaimer, the term of this patent is extended or adjusted under 35 U.S.C. 154(b) by 0 days.

(21) Appl. No.: 13/209,727

(22) Filed: Aug. 15, 2011

(65) Prior Publication Data
US 2011/0297333 A1   Dec. 8, 2011

Related U.S. Application Data

(63) Continuation of application No. 11/132,433, filed on May 19, 2005, now abandoned.

(60) Provisional application No. 60/574,573, filed on May 27, 2004.

(51) Int. Cl.
*A47H 1/00* (2006.01)
*E06B 3/32* (2006.01)
*B64C 1/14* (2006.01)

(52) U.S. Cl.
USPC .......................................... 160/90; 244/129.3

(58) Field of Classification Search
USPC ............... 160/90, 87, 201, 37, 179, 188, 214, 160/205; 244/129.4, 129.3
See application file for complete search history.

(56) References Cited

U.S. PATENT DOCUMENTS

| | | | |
|---|---|---|---|
| 3,906,669 A * | 9/1975 | Vorguitch | 49/372 |
| 4,825,921 A | 5/1989 | Rigter et al. | |
| 5,443,300 A * | 8/1995 | Mohammed | 296/97.4 |
| 6,186,211 B1 * | 2/2001 | Knowles | 160/84.02 |
| 6,230,784 B1 * | 5/2001 | Sanz et al. | 160/84.02 |
| 2001/0000294 A1 | 4/2001 | Kitamura | |
| 2004/0250964 A1 * | 12/2004 | Carmen et al. | 160/120 |
| 2004/0262453 A1 * | 12/2004 | Sanz et al. | 244/129.3 |

FOREIGN PATENT DOCUMENTS

DE   100 19 787 A1   10/2001
WO   03/106805 A1   12/2003

* cited by examiner

*Primary Examiner* — Katherine Mitchell
*Assistant Examiner* — Jeremy Ramsey
(74) *Attorney, Agent, or Firm* — Baker & Hostetler LLP (57) ABSTRACT

An aircraft window shade assembly is provided. The assembly includes an inboard shade, an outboard shade, a housing and a cover. The inboard and outboard shades each include a plurality of holes disposed along one side. The housing includes a transparent inboard panel, a transparent outboard panel, a pair of inboard guide slots to receive the inboard shade, a pair of outboard guide slots to receive the outboard shade, an inboard motor and an outboard motor. The inboard motor is coupled to a drive gear sprocket having a cylindrical outer surface and a plurality of teeth extending radially therefrom that mesh with the plurality of holes in the inboard shade, and moves the inboard shade between open and closed positions. The outboard motor is coupled to a drive gear sprocket having a cylindrical outer surface and a plurality of teeth extending radially therefrom that mesh with the plurality of holes in the outboard shade, and moves the outboard shade between open and closed positions. The cover is attached to the housing and includes a pair of inboard guide slots to receive the inboard shade, and a pair of outboard guide slots to receive the outboard shade.

10 Claims, 10 Drawing Sheets

//* # WINDOW SHADE ASSEMBLY

CROSS-REFERENCE TO RELATED APPLICATIONS

This application is a Continuation of U.S. patent application Ser. No. 11/132,433, filed on May 19, 2005, which claims priority to U.S. Patent Application Ser. No. 60/574,573, filed on filed May 27, 2004, the disclosures of which are hereby incorporated by reference in their entirety.

FIELD OF THE INVENTION

The present invention relates generally to electronically controlled window shades. More particularly, the present invention relates to electronically controlled window shades for aircraft.

BACKGROUND OF THE INVENTION

Window shade mechanisms for commercial aircraft cabin windows serve purposes such as darkening the cabin of an aircraft independent of outside light levels and reducing sunlight glare. Applying substantially complete darkening to an aircraft cabin may be desirable for adapting to a destination's time zone, for example, or allowing a movie to be shown from a central screening location without intrusive light.

Glare reduction is often applied by individual passengers by lowering a shade part way, although such solutions may prove unsatisfactory in some cases with existing window shade styles.

A manually operated window shade, the most familiar form of this device, is presently used in many aircraft. While such shades are arguably inexpensive and generally reliable, a window fitted with a manual shade may be difficult to restore if the shade fails, while the shade itself can provide only a limited range of functions—basically, interposing a light-blocking membrane from the top of a window opening as far down as the user chooses.

Air carrier regulations can require shades to be fully open during takeoff and landing. Applying uniform window shade positioning throughout an aircraft generally necessitates cooperation by passengers, while a flight or ground crew member must move from row to row, checking or moving every shade individually, which can be labor-intensive and time consuming.

Typical existing motorized aircraft window shades use fan fold shade media, i.e., media creased into strips and formed into a stack—to extend and withdraw the shade from the viewing area. These designs depend on a combination of durability, self-hinge flexibility, and opacity in the shade media, as well as durability in the remainder of the involved parts, to achieve reliability goals, and have in many cases proven susceptible to wear. In addition, many such designs, constrained by a need to accumulate the fan folded shade media in a generally horizontal stack, are undesirably thick, intruding into the aircraft cabin to a greater extent than is required for other aircraft structural elements, such as fuselage insulation. Such designs additionally can have perimeter light leaks, since the individual panels of the fan folded shade media assume a range of angles, so that a thorough and cost effective light trap along the boundaries of the shade may be extensive in width or infeasible.

Other design approaches can show drawbacks as well. Typical shade designs in which the shade media is gathered on a spool can have limitations comparable to those of fanfold shades. Shade media driven between pinch rollers may rely on roller traction, which is affected by aging, temperature, contamination, and other factors, and can develop misalignment.

Accordingly, it is desirable to provide a method and apparatus that allow the darkening and glare reduction functions of a window shade to be electronically controllable by an individual passenger. It is further desirable that these functions be provided by a shade assembly that has low thickness and weight, that is housed within a self-contained assembly, that exhibits durability and freedom from environmental degradation, and that can be positioned from a remote location.

SUMMARY OF THE INVENTION

Embodiments of the present invention advantageously provide a window shade assembly for an aircraft. In one embodiment, the window shade assembly includes an inboard shade, an outboard shade, a housing and a cover. The inboard and outboard shades each include a plurality of holes disposed along one side.

In this embodiment, the housing includes a transparent inboard panel, a transparent outboard panel, a pair of inboard guide slots to receive the inboard shade, a pair of outboard guide slots to receive the outboard shade, an inboard motor and an outboard motor. The inboard motor is coupled to a drive gear sprocket having a cylindrical outer surface and a plurality of teeth extending radially therefrom that mesh with the plurality of holes in the inboard shade, and moves the inboard shade between open and closed positions. The outboard motor is coupled to a drive gear sprocket having a cylindrical outer surface and a plurality of teeth extending radially therefrom that mesh with the plurality of holes in the outboard shade, and moves the outboard shade between open and closed positions.

In this embodiment, the cover is attached to the housing and includes a pair of inboard guide slots to receive the inboard shade, and a pair of outboard guide slots to receive the outboard shade.

There have thus been outlined, rather broadly, certain embodiments of the invention in order that the detailed description thereof herein may be better understood, and in order that the present contribution to the art may be better appreciated. There are, of course, additional embodiments of the invention which will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be used as a basis for the designing of other structures, methods, and systems for carrying out the several purposes of the present invention. It is important, therefore, that the claims be regarded as including such equivalent constructions insofar as they do not depart from the spirit and scope of the present invention.

DETAILED DESCRIPTION

The invention will now be described with reference to the drawing figures, in which like reference numerals refer to like parts throughout. An embodiment in accordance with the present invention provides a window shade assembly that accommodates to an aircraft fuselage contour, has low weight and thin profile, can be operated electronically by a passenger using a control device, and can further be operated remotely. In some embodiments, the shade can combine light reducing and light blocking functions.

Figure 1:
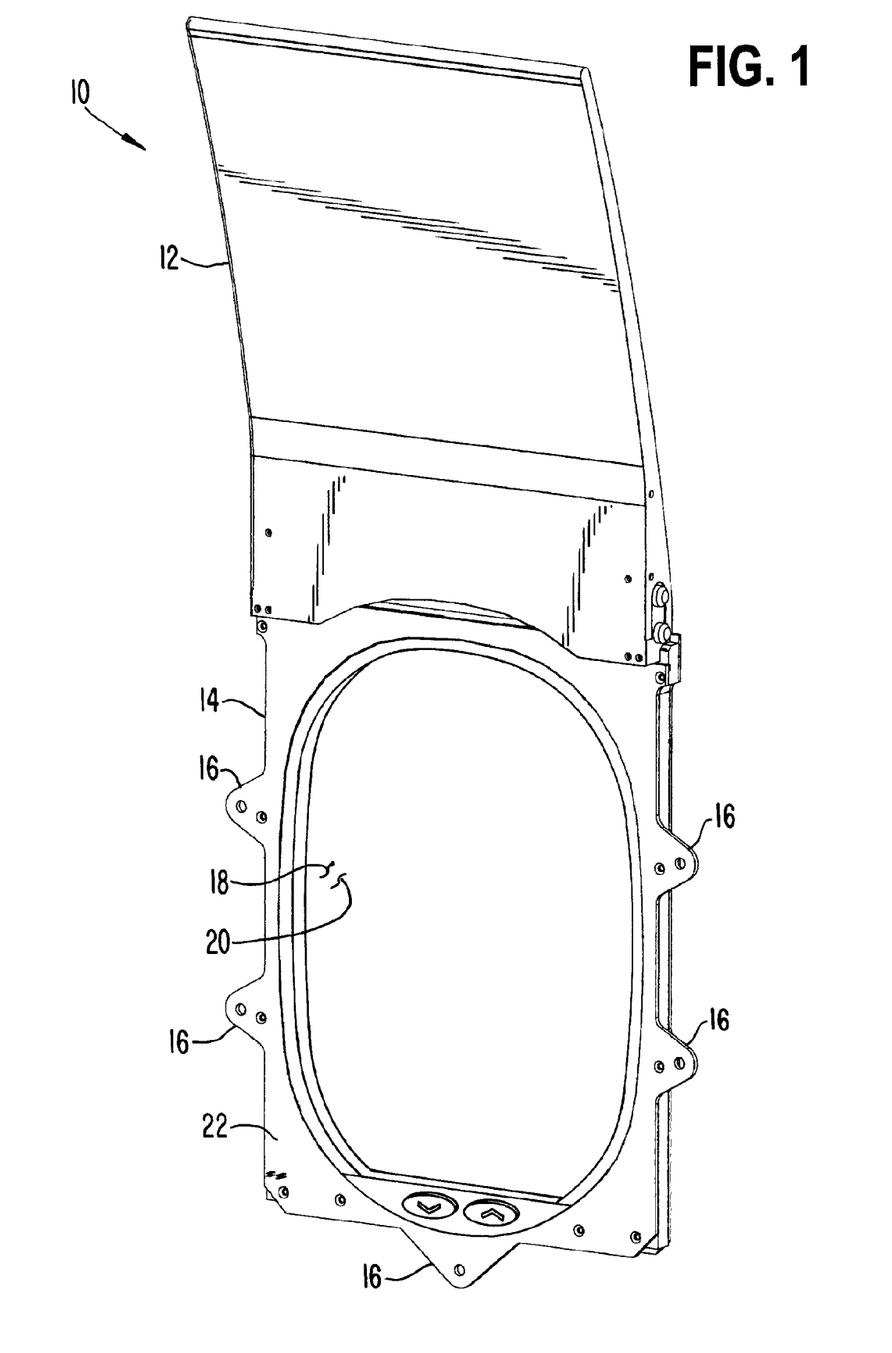
FIG. 1 is a perspective view illustrating a window shade assembly according to a preferred embodiment of the invention.

FIG. 1 is a perspective view showing a self-contained window shade assembly 10 with a cover 12 attached to a housing 14. Mounting flanges 16 are provided for ease of attachment to an aerostructure.

Set into the inboard (i.e., passenger-side) and outboard (i.e., exterior-side) panels of the housing 14 are panels made from a suitable window pane material, the properties of which in some embodiments combine visual clarity, thinness, and low weight with resistance to scratching, shattering, and chemical attack. Visual clarity of a quality referred to as optical transparency is generally understood to imply that scant evidence of the interposed panels will be detectable either by direct inspection or in (non-flash) photographs taken through the panels. The inboard transparent panel 18 is intended for direct exposure to the aircraft interior, and is thus likely to be subject to grooming products, skin oils, cleaning agents, and other chemical exposure, as well as to contact with dust particles, tobacco smoke, solid objects, and other abrasives.

Because scratches and other damage to the inboard transparent panels 18 are likely to occur despite good choices of materials, it is desirable, for some embodiments, that the inboard panels 18, at least, be readily replaceable. Ready replaceability may be enhanced by providing an interlocking inboard housing plate 22 that can be attached to the assembly 10, for example using fasteners such as screws, so that the inboard housing plate 22 clamps the inboard transparent panel 18 in place when attached. In other embodiments, it may be preferable that a similar configuration be assembled using integral interlocking elements between the inboard housing plate 22 and left- and right-side side rails 36 and 38, shown in FIGS. 2 and 6, thereby eliminating one or more separate metal fastenings. In still other embodiments, it may be preferable to form the inboard housing plate 22 and the inboard transparent panel 18 in a single replaceable unit, wherein the single unit is all transparent, is co-molded from multiple materials, or is given an opaque coating in part, thereby eliminating the housing plate 22 as a separate component. In yet other embodiments, it may be preferable to treat part or all of the assembly 10 as disposable, rather than supporting the transparent panel 18 as a replaceable component.

The housing 14 typically includes several components (see FIG. 6 for an exploded view of one embodiment) to which the inboard 18 and outboard 20 transparent panels are attached. The cover 12 functions as a protective enclosure over the motor drive assembly or assemblies (see FIGS. 2 and 3 for more detail) and over the travel path and storage location of one or more shades when the shades are retracted.

Figure 2:
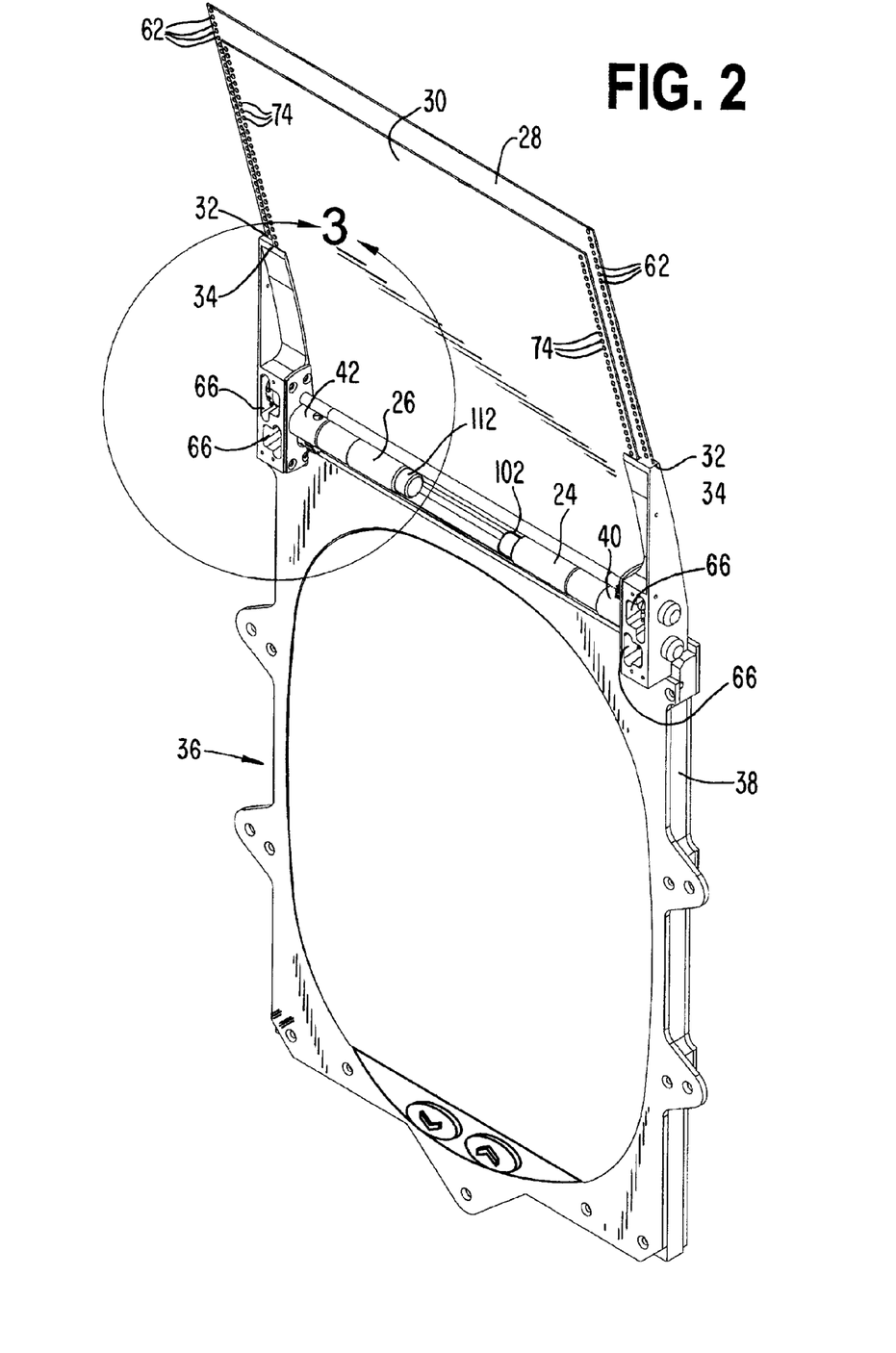
FIG. 2 is a perspective view of the window shade assembly of FIG. 1 with the cover removed.

FIG. 2 is a perspective view showing the assembly 10 of FIG. 1 with the cover 12 removed. The section line 3 identifies the view of FIG. 3, in which a representative motor and drive assembly within a dual-shade configuration is shown. In FIG. 2, the outboard and inboard shade drive motors 24 and 26, respectively, are coupled to outboard and inboard rectangular shades 28 and 30, respectively. The shades 28 and 30 are positioned by pairs of inboard guide slots 32 and outboard guide slots 34, respectively, with one of each of the slots 32 and 34 located in (viewed from inboard) left side and right side dual-slot side rails 36 and 38, respectively. The right side rail 38 is attached to the outboard drive motor 24 by a right motor mount 40, while the inboard drive motor 26 is attached to the left side rail 36 by a left motor mount 42.

Figure 3:
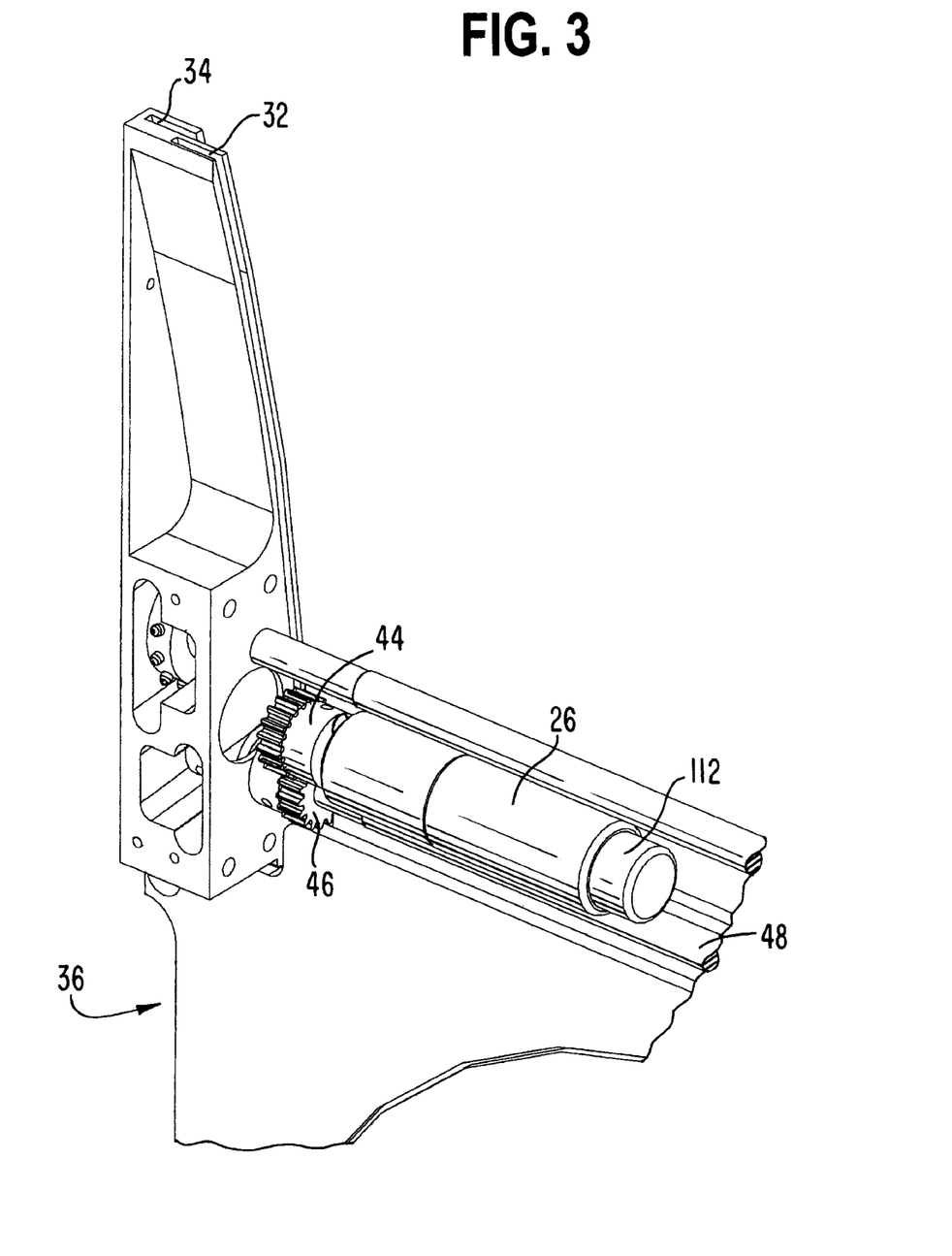
FIG. 3 is a perspective view of a drive motor, a drive assembly, and a portion of a guide assembly.

FIG. 3 shows the left dual-slot side rail 36 viewed from roughly the angle of FIG. 2, with the cover (12 in FIG. 1), shades (28 and 30 in FIG. 2), and left motor mount (42 in FIG. 2) omitted for clarity. A pinion 44 attached to the inboard drive motor 26 meshes with a driven gear 46 attached to an inboard drive shaft 48. The curvature of the outboard and inboard guide slots 32 and 34, respectively, above the motor area directs the shades 28 and 30, shown in FIG. 2, along generally parallel, deflected, substantially straight paths, to which the cover 12, shown in FIG. 1, generally conforms. The angle offset afforded by the curvature permits the assembly 10 to conform in part to the profile of some aircraft fuselages. The extent to which guide slots 32 and 34 are curved may be determined by the requirements of specific applications, and may be limited by drag and wear considerations for specific combinations of guide and shade materials. The cover 12 may provide further deflection in some embodiments.

Figure 4:
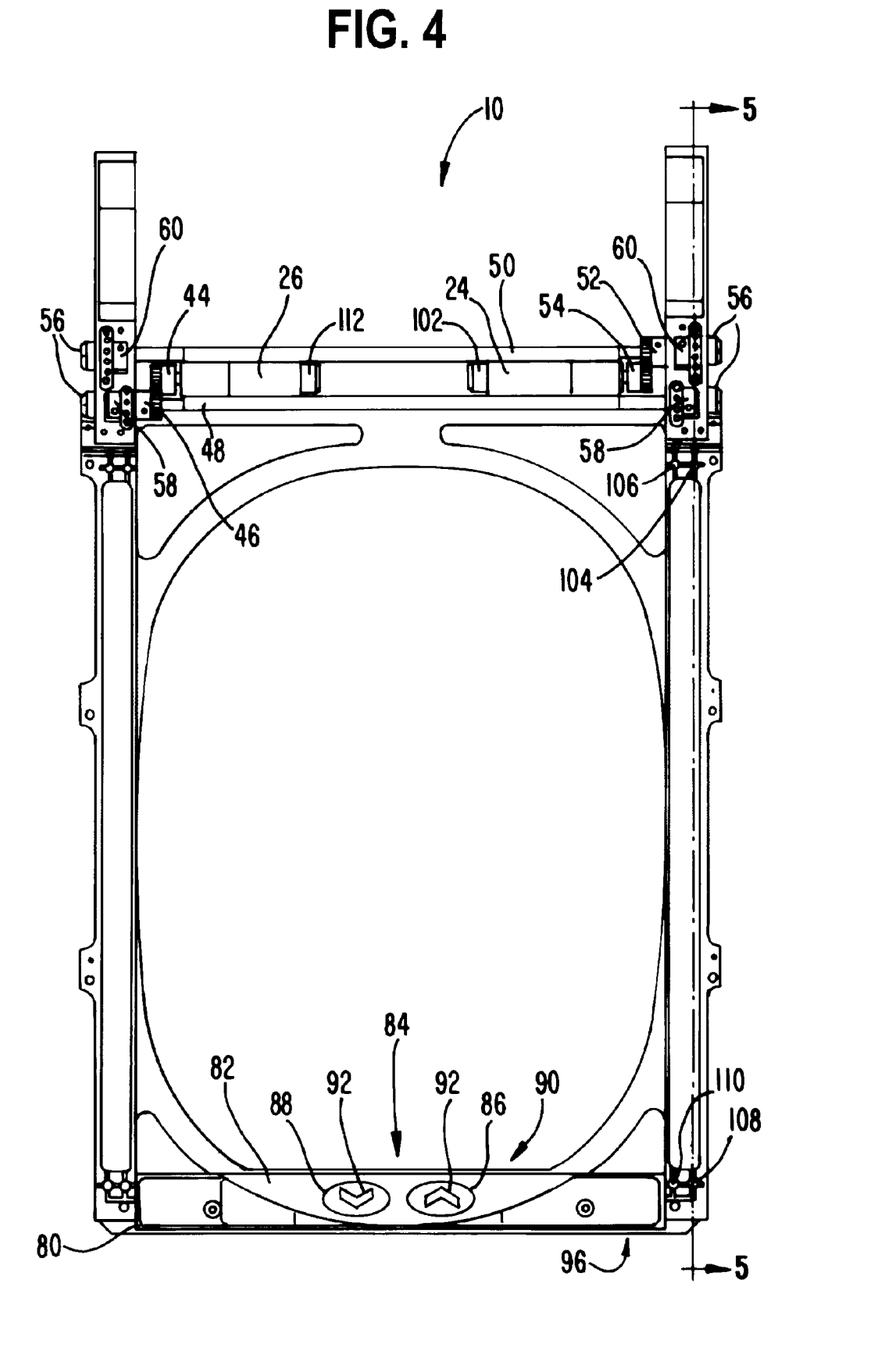
FIG. 4 is a face view of a window shade assembly showing more drive details.

FIG. 4 is an inboard-side face view of the assembly 10 with the cover (12, shown in FIG. 1) and shades (28 and 30, shown in FIG. 2) omitted. In this view, the inboard drive shaft 48 and the outboard drive shaft 50 with their respective driven gears 46 and 52 may be seen. In an arrangement equivalent to that shown in FIG. 3, the outboard drive motor 24 is connected to an outboard pinion 54 that drives the outboard driven gear 52, which is in turn coupled to the outboard shaft 50. Bearing cups 56 support and locate the two shafts 48 and 50 at each end thereof. Also visible in this view are inboard sprockets 58, which are coupled to inboard shaft 48, and outboard sprockets 60, which are coupled to outboard shaft 50. Shade position sensors 104, 106, 108, and 110, and control panel 82 elements, shown in this view, will be discussed in functional terms below under FIG. 7, the functional block diagram.

Figure 5:
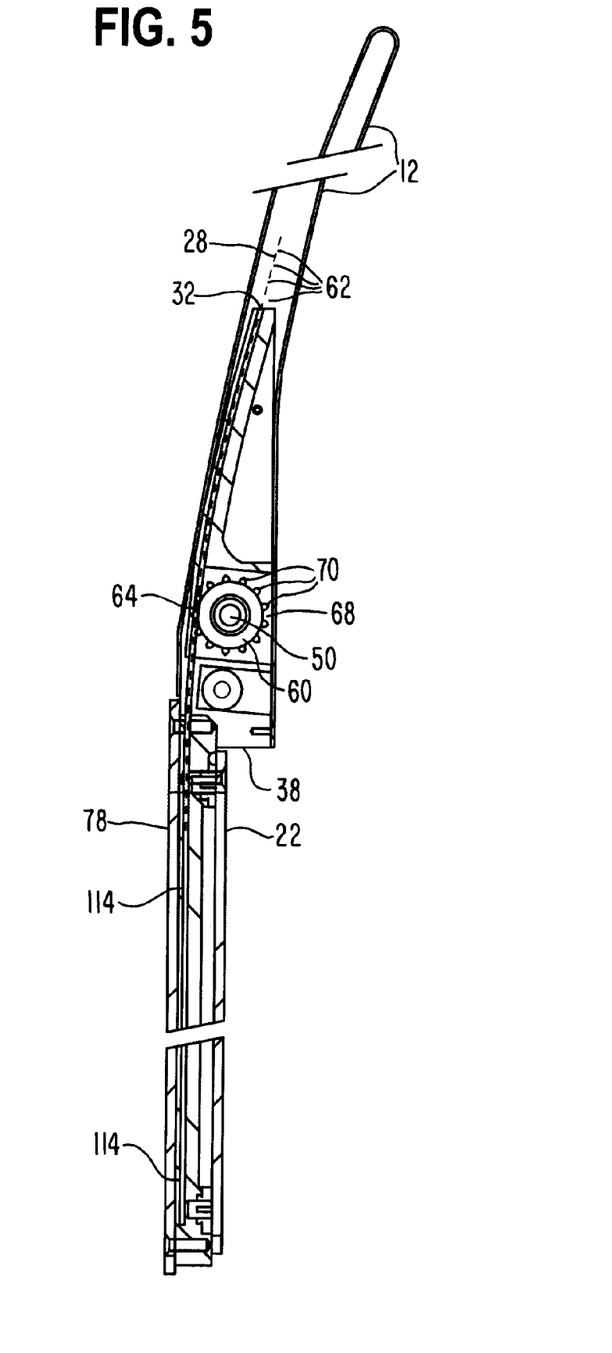
FIG. 5 is a section view per FIG. 4.

FIG. 5 is a section according to the cut plane 5-5 in FIG. 4, looking to the right through the right dual-slot side rail 38 in the center plane of the outboard sprocket teeth 70, with the cover 12 and the outboard shade 28 shown to clarify the relationship between the drive sprockets and the shades. The interface between the outboard shade 28 and the outboard drive sprockets 60 attached to the outboard drive shaft 50 is the rows of outboard drive holes 62, of which rows both are shown in FIG. 2, in the outboard shade 28. The region of the surface of the outboard guide slot 32 proximate to the outboard drive sprocket 60 and forming with the sprocket 60 a passage for the shade 28 functions as a guide shoe 64 to regulate the position of the outboard shade 28 with respect to the outboard drive sprocket teeth 70, and thus to control mesh between the sprocket teeth 70 and the outboard holes 62. An equivalent arrangement couples the inboard shade 30 to the inboard drive sprockets 58, shown in FIG. 3, and attached to the inboard shaft 48. Rows of inboard drive holes 74 in the inboard shade 30, shown in FIG. 2, are captured between the inboard sprockets 58, shown in FIG. 4. A proximal portion of each inboard guide slot 34 similarly forms a guide shoe (not visible in FIG. 5) regulating mesh between the teeth of inboard sprocket 58 and the inboard holes 74, shown in FIG. 2.

FIG. 5 further clarifies the relationship between the outboard shade 28 and the drive mechanism. In the embodiment shown, the outboard sprocket 60 has a substantially cylindrical outer surface 68 that makes rolling contact with the outboard shade 28. Sprocket teeth 70 that protrude from the sprocket outer surface 68 preferably have a profile that allows entry into and release from outboard drive holes 62 without significant sliding contact. The outboard guide slot guide shoe 64 area is positioned with respect to the sprocket surface 68 to maintain low friction while assuring that the shade 28 accepts and releases the sprocket teeth 70 without appreciable binding.

A shade according to the present invention may be substantially completely light blocking, i.e., opaque, or may be either translucent (largely diffusing) or semitransparent (dimming but allowing outside objects to be seen clearly). A window assembly 10 incorporating two shades may incorporate a combination of these types. A three or four shade window assembly 10 is likewise feasible; some combination of increased miniaturization, changes in materials selection, increased overall assembly thickness, and widening of the guide slot region between the mounting flanges 16 and the transparent panels may be required to accommodate a succession of increasingly widely spaced drive sprockets and theirs. In a typical application with more than two shades, additional motor and drive assemblies are narrower, are configured below the two shown in FIG. 2, and operate narrower shades mounted further inboard (or the converse), while the added electronic functions include sensor, control, and driver circuits for the additional motors and shades.

Figure 6:
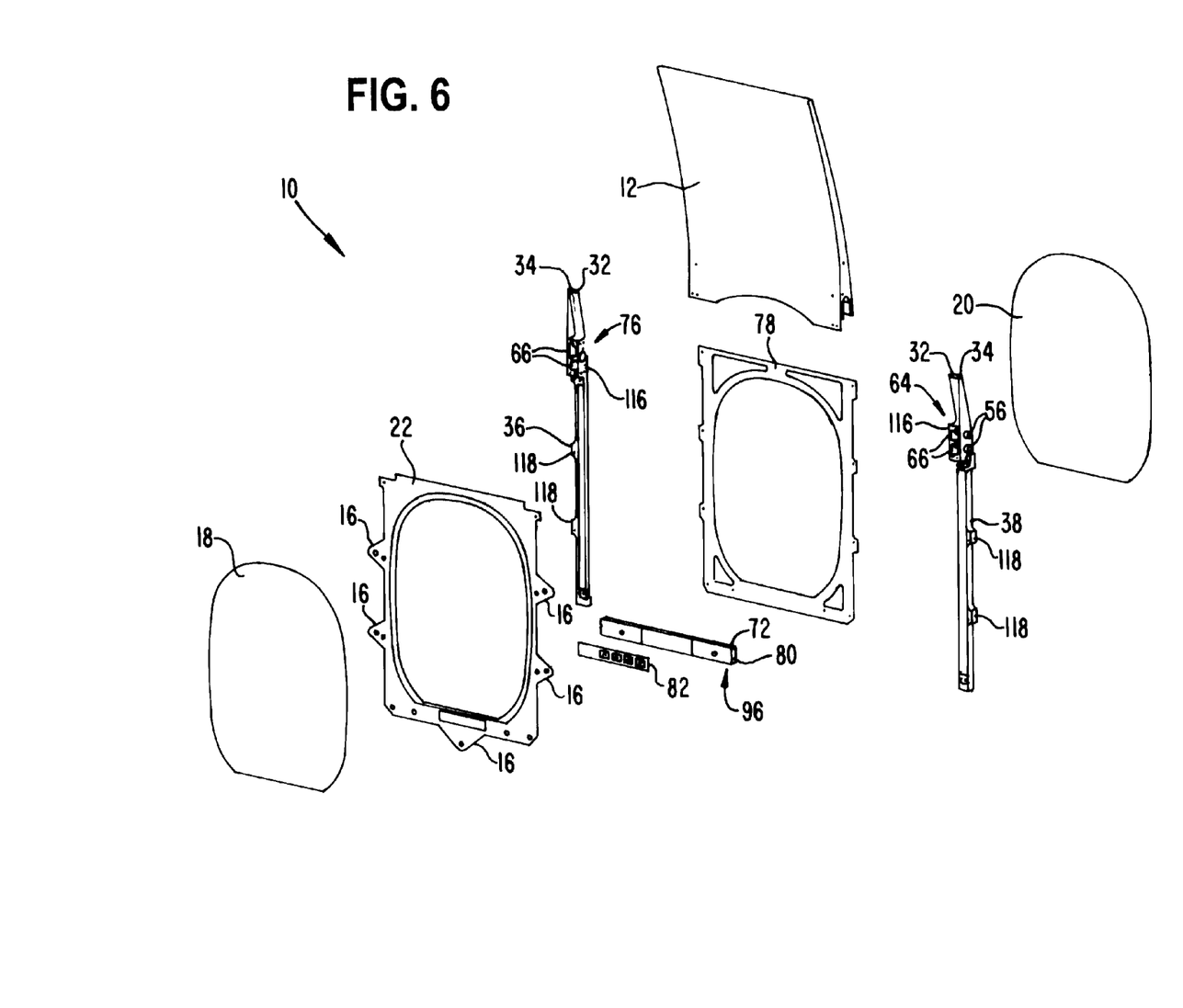
FIG. 6 is an exploded view of a window shade assembly.

FIG. 6 is an exploded diagram of the assembly 10, showing the structural elements of the components described above. In this view, the individual elements making up a complete assembly 10 according to a representative embodiment are shown using the same reference numerals as above. In the embodiment shown, the dual-slot side rails 36 and 38 are represented as single units that incorporate, in addition to respective motor mount attachment surfaces 116, and sprocket clearance apertures 66, attachment frame elements 118 connecting the inboard and outboard housing plates 22 and 78, respectively, and guide/light block elements 32 and 34, guide shoe regions 64 and 76, and drive shaft bearing cups 56 (partially obscured in this view, but each visible in at least one of FIGS. 3, 4, and 5). Each of these elements may in some embodiments be integral with the rails, may each be a separate component, or may be molded separately and incorporated by multiple injection molding into a single component. The cross rail 80, with its bottom light trap 72, discussed below, receives a control panel 82 and provides a connector 96 interface.

Assurance of substantially complete light blocking for a light-blocking shade can be enhanced by providing a continuous light baffle on each boundary of the shade. This can be achieved by using structural elements and a shade 28 that are substantially completely opaque for all visible wavelengths, and by providing guide slots 32 and a bottom boundary surface light trap 72 that largely obstruct light reflections.

A gap between the inboard and outboard mounting frames 22 and 78, respectively, shown in FIG. 6, allows passage of the outboard shade 28 from a storage position within the cover 12 into a light blocking position between inboard and outboard transparent panels 18 and 20, respectively. In some embodiments, provision of a substantially opaque and non-reflective housing 14 permits the gap between mounting frames 22 and 78 to occupy the full extent of the space therebetween, without permitting appreciable passage of light past the closed shade 28. In other embodiments, provision of an additional component between the guide rails 36 and 38, proximal to the housing 14, and having a light-blocking slot through which each shade passes, may be incorporated to increase light blockage.

Thinness and uniformity in the shade 28 and closeness of fit in the guide slots 32 can further improve blocking. For example, a close fit between slots 32, bottom trap 72, and shade 28 in the closed position can increase the number of reflections necessary for a light ray to travel around the shade 28, and can thus increase attenuation of unwanted light. Material color and surface finish in some embodiments can contribute to a reduction in light path reflectivity. Black color and a specified degree of surface roughness, for example, may be preferred. Multiple grooves of specified dimensions in the guide slot 32 and bottom trap 72, with the grooves typically parallel to the proximal shade 28 boundary surface, may likewise attenuate unwanted light in some embodiments.

Returning to FIG. 4, a local user interface may be seen, including the control panel 82 integrated with the assembly 10. A control panel 82 having one or more momentary-contact button-style membrane switches in a keypad 84 can command motion for the shades 28 and 30 according to a preferred electronic embodiment. For example, in the two-button arrangement shown, an "up" button 86 and a "down" button 88 as shown in FIG. 4 can be used to command the shades to move sequentially—that is, a first shade normally moves to an end of travel and stops before the same button can command the second shade to move in the same direction, where the identity of the first shade is defined by the implementer. For another example, an embodiment can allow a user to command go-to-end capability for the currently active shade, such as by configuring the controller (discussed in FIG. 7, below) to detect a rapid double press of a button.

Each button can feature tactile feel (a slight "click" sensation when applied pressure is in a desired force range). The keypad 84 can use a monolithic, durable, flexible cover film. A cover film, if used, can provide a translucent or transparent zone, either immediately over each button or over an area that includes both the buttons 86 and 88 and some portion of their surroundings, so that a backlight 90 can be provided to identify and allow distinguishing the buttons 86 and 88 in low-light environments. The buttons may in some embodiments include raised or recessed distinctive symbols 92 to allow tactile as well as visual cues to be used, such as by passengers with low visual acuity.

Alternate passenger control inputs are likewise suitable for some embodiments. For example, a control panel 82 embodiment may use four buttons, as shown in FIG. 6, whereby each shade can be commanded directly, or whereby a go-to-end command can be input with a dedicated button. The control panel 82 may be formed at an angle that eases viewing or access.

Figure 7:
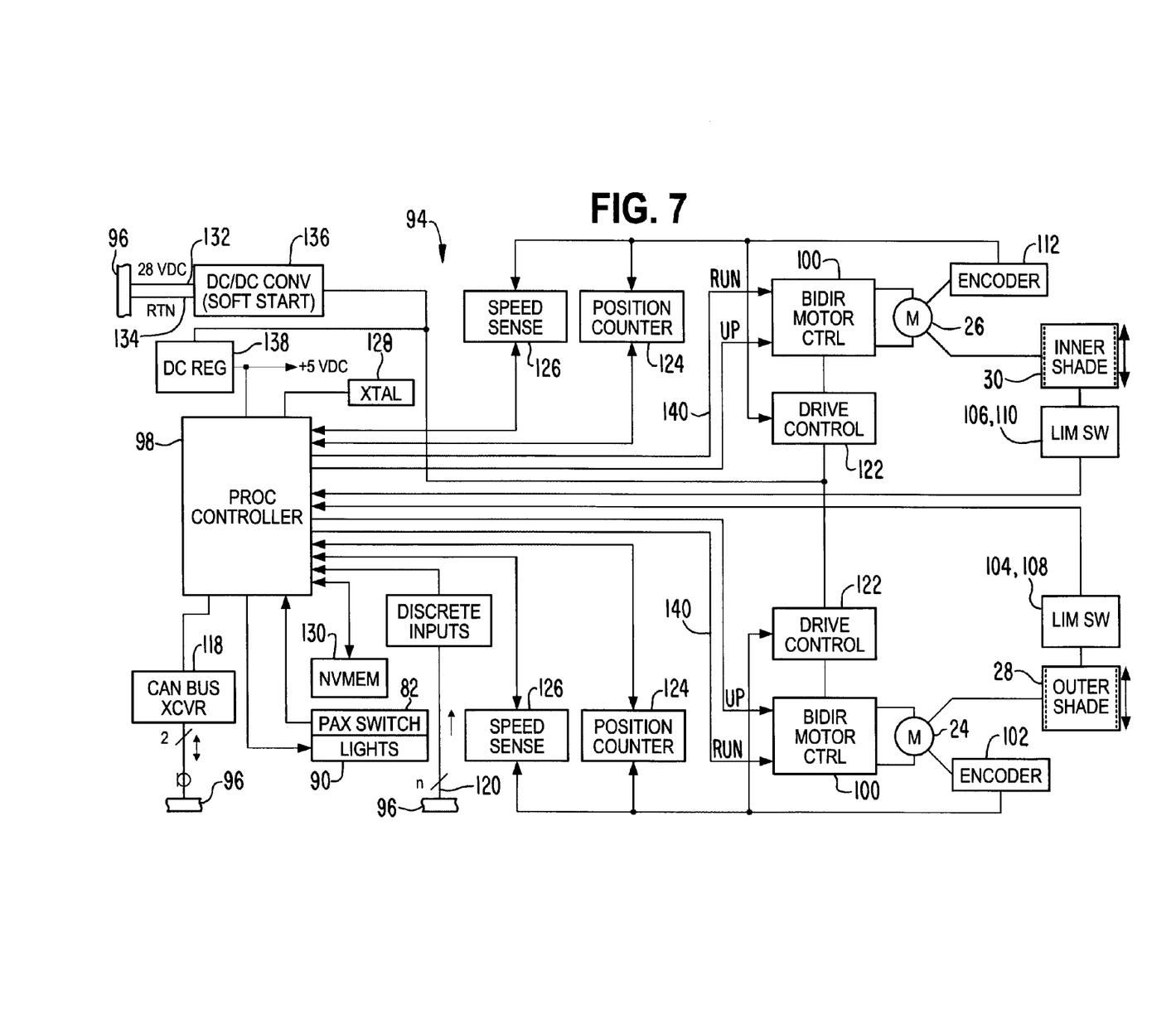
FIG. 7 is a block diagram illustrating the electronic hardware elements of a dual shade position controller.

FIG. 7 is a block diagram showing electronic, electromechanical, and relevant mechanical components of a dual shade mechanism drive 94 according to the invention. Note that several of the hardware elements shown in others of the drawings also appear in FIG. 7. The control panel, referred to in FIG. 7 as a "PAX (personnel access) switch" 82, provides local interface, commanding operation via buttons. Electrical connection to the assembly 10 uses an input connector 96, shown piecewise throughout FIG. 7, that can accept input power 132, ground return 134, and, in some embodiments, discrete command inputs 120 such as shade position, backlight brightness, and the like. Input power for typical aircraft applications is nominally 28 VDC, with excursions to 16 VDC and 32 VDC required to be tolerated by flight hardware. A regulator such as a DC/DC converter 136 in some embodiments accepts this raw power and produces an output voltage having a level and degree of regulation suitable for the drive control 122 circuitry of the apparatus. A further regulator 138 can prepare voltages suitable for electronic components, shown in FIG. 7 as +5 VDC, and regulated to other voltage levels, such as 3.3 VDC, in other embodiments.

In some embodiments, digital remote command inputs can be applied, using, for example, a standard serial data transfer technology such as CANbus (International Standards Organization standard ISO 11898) to pass commands, for which a CANbus transceiver 118 is preferred.

Since some commands can apply to all of the window shade mechanisms in an aircraft, can be configured to be substantially identical, and can be configured for simultaneous execution, it may be preferable in some embodiments to implement a common message transmission mode such as the CANbus broadcast mode. Broadcast mode implementation embeds broadcast mode flag bits in commands and is defined so that received commands carrying such bits may not require explicit addresses. In some embodiments, certain commands can be issued that do not require responses by individual units. In some embodiments, state-of-health inquiries and other messages may require responses, while other embodiments may support initiating communications such as fault condition reports without first being polled.

Prevention of high peak electrical current draw in a system with multiple shade assemblies 10 may necessitate gradual application of motor power in some embodiments, for which multiple strategies are available. For example, in one strategy, specific time delays, associated with individual assembly 10 addresses, can distribute initiation of motor starting surges to a desired extent despite using a common start command. In another strategy, assemblies 10 can be assigned to groups, with the groups commanded separately, so that multiple, smaller current peaks are demanded. In still another strategy, initial motor voltage can be ramped up within each assembly 10 (or, equivalently, a pulse width modulator drive can use a gradually increasing pulse width and can tap its power in part from capacitance within each assembly 10), so that speed increases gradually and inertia-driven peak load is reduced. Other strategies may be preferred for specific embodiments.

Within a CANbus or like digital remote command configuration, individual addressing of each assembly 10 may be required, for which a variety of addressing systems are possible. In all schemes described below, an address assigned to a assembly 10 is included as part of a transmitted message, sensed by all assemblies 10, and recognized by a single assembly 10 having that address. The one selected assembly 10 processes the message. In some embodiments, the central system may at some time transmit a message to each possible address in order to search for anomalies.

A representative bus-oriented addressing scheme provides address selection pins along with any other discrete input signals 120 in the electrical connectors 96, so that an individual assembly 10 has an address determined by jumpers in the mating connector in its installation location. A similar addressing scheme can include switches, fusible links, pins to accept discrete jumpers, or the equivalent built into the assembly 10 in hardware and set preparatory to installing the assembly 10 at a specific location. In other embodiments, an address can be written to nonvolatile data storage (NVMEM 130) within each assembly 10. Each assembly 10 can include a media access control (MAC) address in addition to or in place of a location-oriented address within a system. Still other embodiments can establish addresses using any of a variety of processes that allow each assembly 10 to determine its location dynamically within a string of assemblies 10 on a common bus, for example by a hardware/software bus contention resolution process.

CANbus support for bidirectional communication, which in some embodiments supports interrogating and receiving replies from individual devices, further allows a central control station for a zone or an entire aircraft to periodically poll individual assemblies 10 to ascertain their status. Communication functionality for CANbus 118 can be embedded in a field programmable gate array (FPGA) or other control device within each individual assembly controller 98 to support all functions of both the local control panel 82 and the bus 118 command structures.

Commands from a central control station can include multiple functions specified by the central station. A preferred shade motion speed or backlight 90 power level, for example, can be included in a system having central control of multiple possible values in some embodiments. In such embodiments, level setting commands broadcast from the central station can adjust a property for all windows in a series of steps. Similarly, shade height for one or both of the shades 28 and 30 in the assemblies 10 can be selectable, with position accuracy limited by the resolution with which a specific embodiment can detect shade 28 and 30 position. Commands from a central station can include individual or global disabling or enabling of local control of shades if desired, without requiring that power be removed from the shades.

Alternative control methods include provision of dedicated input pins on the input connector 96. In some embodiments, such pins may be assigned as remote control inputs, assigned, for example, to allow a business-class seat to include a built-in control panel that operates more than one shade. Such a control function can be assigned a priority, allowing the remote input to override local control on the assembly 10 itself, but to be in turn overridden by central station controls. In other embodiments, such inputs may instead accept analog signal levels for desired functions. Such inputs can include, for example, a dedicated pin carrying a light level signal, functioning as a control input or supplying power directly to the backlight device 90 in each assembly 10. Another input can be an analog control signal to select a particular position or rate for one of the shades. Still another input can be a control signal to disable local operation.

Whether controlled using digital or analog commands, the control functions are applied in a typical embodiment to a controller 98 housed within each assembly 10. A preferred mounting location embeds the controller 98 within the cross rail 80, proximal to the control panel 82, and positioned appropriately with respect to the connector 96, as shown in FIG. 6. Control functions, applied to power circuitry (i.e., bidirectional motor controllers) 100, which in some embodiments may be housed within the same device as the controller 98, actuate the drive motors 24 and 26. In addition to the control panel 82 and input connector 96 inputs, the preferred embodiment includes an outboard encoder 102 in the outboard drive motor 24, and an inboard encoder 112 in the inboard drive motor 26.

Drive voltage control 122 for each motor controller 100 can be implemented as hardware components or as a software-based or FPGA function within the controller 98. Variable-voltage drive control 122 can be used as an output to regulate speed of a motor under load, and thereby to make the speed of individual assemblies 10 relatively uniform. Similarly, position counter 124 and speed sense 126 functions for the encoders 102 and 112, used as data inputs for the speed regulation function, can be implemented in hardware, software, or FPGA functions. Each of these functions can contribute to allowing shade motion to be highly uniform from device to device, particularly when a signal such as an internal crystal clock 128, a master signal such as a periodic transmission from the CANbus, or the like is used as a reference against which to compare shade speed. A position counter 124 can be used to determine location, and can compare its operation to end-of-travel sensing both to calibrate for absolute position and to detect incipient failures.

Additional sensors, provided for the inboard and outboard shades in the form of top-of-travel detectors 104 and 106, respectively, and bottom-of-travel detectors 108 and 110, respectively, shown in FIG. 4, are summarized as limit switches 104, 106, 108, and 110 in FIG. 7.

Sensor technology in some embodiments uses shared-housing optical transmitter-receiver sensors 104, 106, 108, and 110, shown physically in FIG. 4. In some such embodiments, light from a light emitting diode (LED) or laser transmitter within the sensor bounces off the surface of the intended shades 28 or 30 and strikes a receiver within the sensor, when the shade is present at that end of travel. The light fails to be reflected, and is diffused, when the shade is absent. Optical detectors in other embodiments can use an optically reflective surface at the distal wall 114 of the sensor zone, shown in FIG. 5 for shade 28, so that the presence of the shade 28 blocks a transmitted beam from reaching a receiver in a housing shared with the transmitter. Separate transmitter and receiver devices on opposite sides of a shade may likewise be preferred for still other embodiments, as may acoustic, ferromagnetic, capacitive, or other non-contact physical phenomena for position or end-of-travel detection. In yet other embodiments, contact-based detection may be preferred, or use of a detection process such as application of motor power without motor motion (i.e., stalling) to detect that end of travel has been reached without using separate end of travel sensors. A stall-type function combined with end of travel sensing can be used to detect some failures.

As shown in FIG. 4, two sensors, a first one 108 at the cross rail 80 end of the assembly 10 and a second one 104 near the drive mechanisms, are used for the outboard shade 28, and another two, 110 and 106, respectively, for the inboard shade 30, in some embodiments. In such embodiments, the presence of a shade, sensed by the sensor nearest the cross rail 80, shown in FIGS. 4 and 6, indicates that a shade is fully inserted, while sensing the absence of a shade by the corresponding drive-end sensor indicates that that shade is fully withdrawn.

The outboard motor encoder 102 allows the outboard motor 24 angular position to be detected. Since the motor 24 is positively coupled to the shade 28, a signal from the encoder 102 is directly associated with outboard shade 28 position and rate. An equivalent arrangement allows an inboard motor encoder 112 on the inboard motor 26 to detect position and rate for the inboard shade 30.

Absent reception of a CANbus input, the main controller 98 in some embodiments scans the passenger switch (control panel 82) and the discrete inputs 120 at periodic intervals, such as every 0.1 seconds, to detect commanded position changes for the window shades. When a position change request is sensed, whether by CANbus message, by control panel switches 86 and 88, shown in FIG. 4, or by discrete inputs 120, the main controller 98 provides an up/down signal to a motor controller 100 to start shade motion.

During shade movement, the main controller or processor 98 (microprocessor) also senses signals from position counters 124, whereby the main controller 98 can determine if the shade has reached a CANbus commanded position, and can acquire data for performing functions such as speed correction.

The speed correction function is accomplished by comparing position counter 124 value change versus elapsed time, using a time reference such as a countdown function in the main processor 98, regulated by a crystal-stabilized oscillator 128. In some embodiments, a motor control signal 140 to the affected motor controller 100 can be removed briefly at short intervals in all modes of operation. The intervals can be increased, for example, if the affected speed sense 126 runs slow, compensating for a reduction in net motor speed. This form of pulse width modulation effectively changes the average DC voltage applied to the motor, and thus provides variable motor speed. A calibration discrepancy, such as inability to set a desired rate or detection of an unexpectedly large or small encoder pulse count in an end-to-end traverse, can be an early failure signal, and can be reported in CANbus status polling replies in some embodiments.

The main controller 98 may, in some embodiments, periodically or after detection of imminent power loss, for example, store data describing the shade position using nonvolatile memory 130 such as flash memory, so that shade positions may be recalled after restoration of power. In other embodiments, it may be preferable for the main controller 98 to command one or both shades to move successively to one or both ends of travel in order to sense position, and to thereupon return the shades to a default position or to their respective initial positions. Each of these and other control routines may be preferable in some embodiments. Detection of end-of-travel events can allow functional checks such as end-to-end encoder counts to be performed as background activities and the results thereof stored in nonvolatile memory 130 during normal operation.

The above-referenced 0.1-second scan interval for monitoring button presses is short enough in many embodiments to provide motion with negligible lag from a user's viewpoint, while permitting main controller 98 operation to be comparatively slow and thus low in power consumption and electrical noise generation. Other scan intervals may be preferred in some embodiments, while non-scanned control systems, such as interrupt-based or digital signal processor-based control functions, may be preferred in other embodiments.

Interpretations of button press signals to control shade movement may vary with application preference. For example, in a basic configuration, each button press may cause motion only as long as the button is held. Movement of the second shade may be commanded using the same button after the first shade has reached its end of travel, either by requiring momentary release of the button or allowing the button to be held continuously. The same hierarchy can apply in the reverse direction, normally using a second button, although successive presses of a single button may reverse the direction of motion in some embodiments.

In other embodiments, a single momentary button press may start the default shade moving, and a subsequent press while moving can stop that shade. (The default shade from a fully-opened condition would be the light dimming shade in many embodiments, while the default shade from fully-closed would be the opaque shade.) A subsequent press of the button after the default shade stops can be interpreted as a command for the other shade, even if the default shade is not at the directed end of travel. By similar logic, pressing a button after the second shade stops could be interpreted as a command for the default shade again. The system can be configured so that, after an elapsed (programmable) interval with no switch action, the next switch press is interpreted as a command to the default shade. The press-and-hold functionality can be superimposed on this function.

Similarly, a rapid double-press of a button can be interpreted as a command to move the default shade to its end of travel, or, if the default shade is already at its end of travel, to move the non-default shade.

The apparatus has been demonstrated to have exceptional durability compared to previous designs, but is still subject to premature wear if abused. For example, extended cycling of the mechanism, by way of either substantially continuous run commands or application of many start-and-stop cycles, may be undesirable. A programmed function can monitor operation for abuse and disable operation temporarily. In some embodiments, a fixed or sliding-window time interval such as two minutes can be established, and an abuse criterion such as the number of position counts or motion start events in the interval can be compared to a reference value. If the count is excessive, local command inputs 82 or discrete inputs 120 can be disabled for an interval, such as five minutes, sufficient to discourage such activity. CANbus operation would in typical embodiments be unaffected by this control. Alternative time intervals and abuse protection methods may be preferred in various embodiments.

It may be desirable in some embodiments to provide a manual override, by which a window shade can be moved to block or pass light without availability of electrical power, for example, or after a failure in the window shade apparatus. Such a function can be added to the embodiments described above by adding a manually operated device capable of moving one or more shades.

Figure 8:
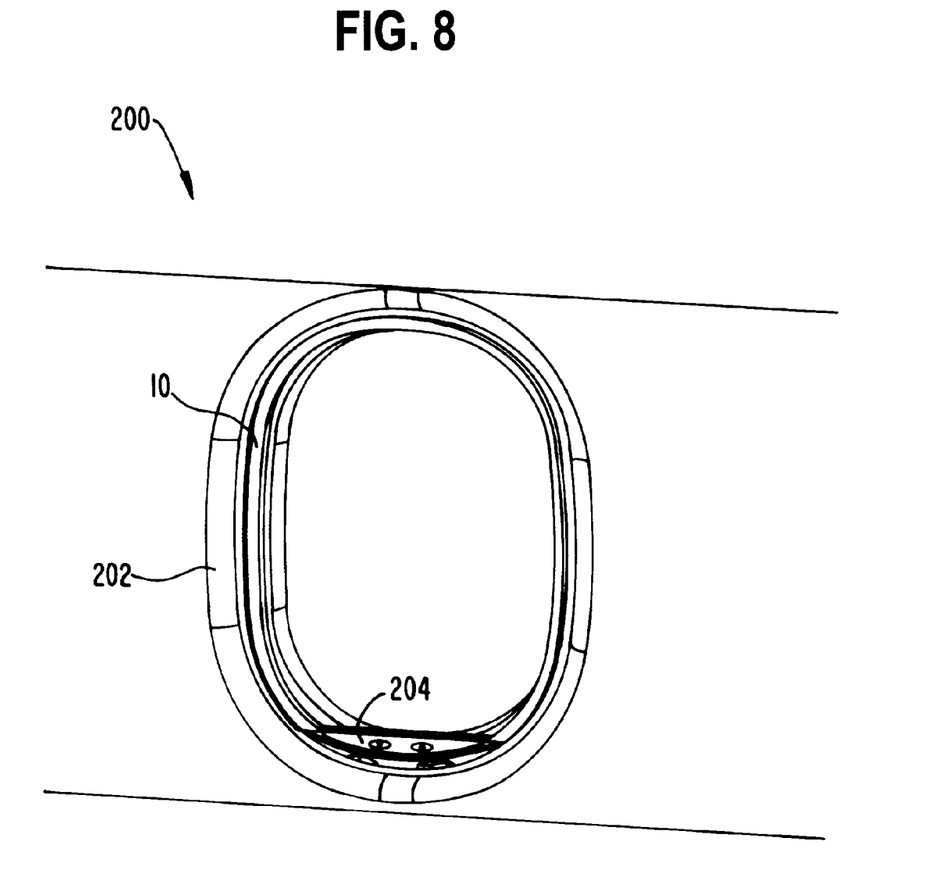
FIG. 8 is a view of a normal installation of a window shade assembly having a manual override mechanism.

FIG. 8 is a perspective view of an installation 200 from inside an aircraft, showing a typical window shade assembly 10 installed behind a cabin frame 202, and including a local control panel 204.

Figure 9:
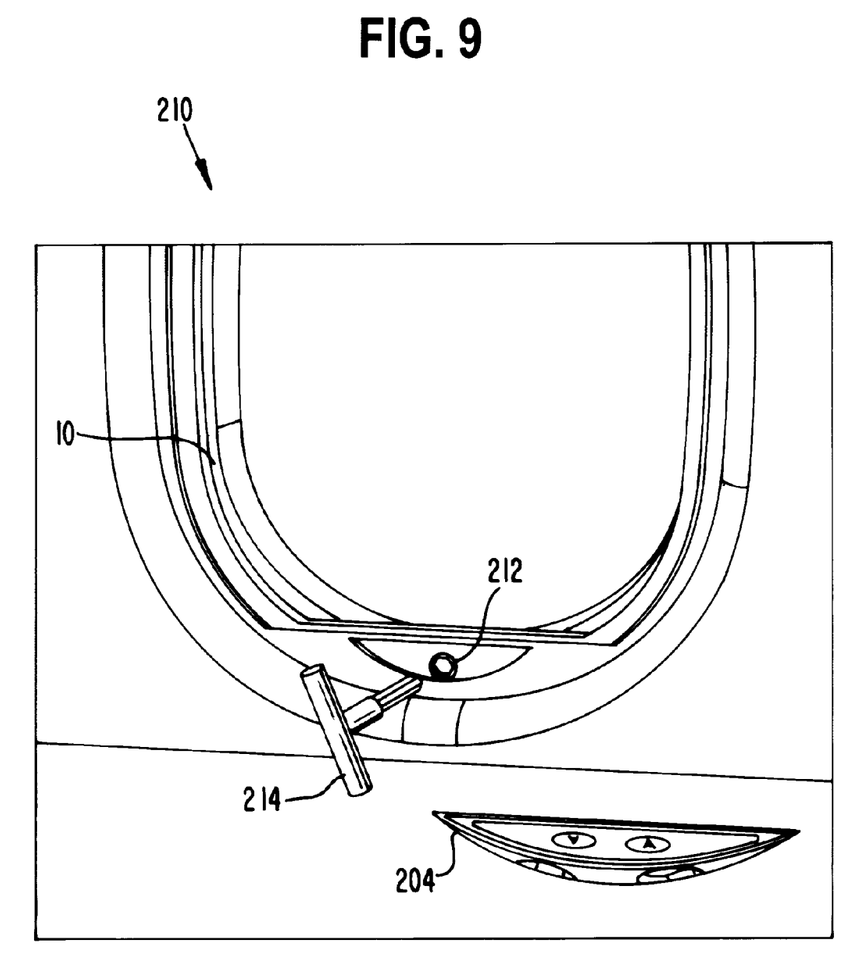
FIG. 9 is a view of a assembly prepared for actuation of the manual override mechanism.

FIG. 9 is a perspective view of an installation prepared for manual override operation 210, showing that removing the panel 204 reveals a spindle 212 into which a tool such as the one shown 214 can be inserted. Rotating the tool 214 causes all shades in the window shade assembly 10 to be urged upward into a fully open position.

Figure 10:
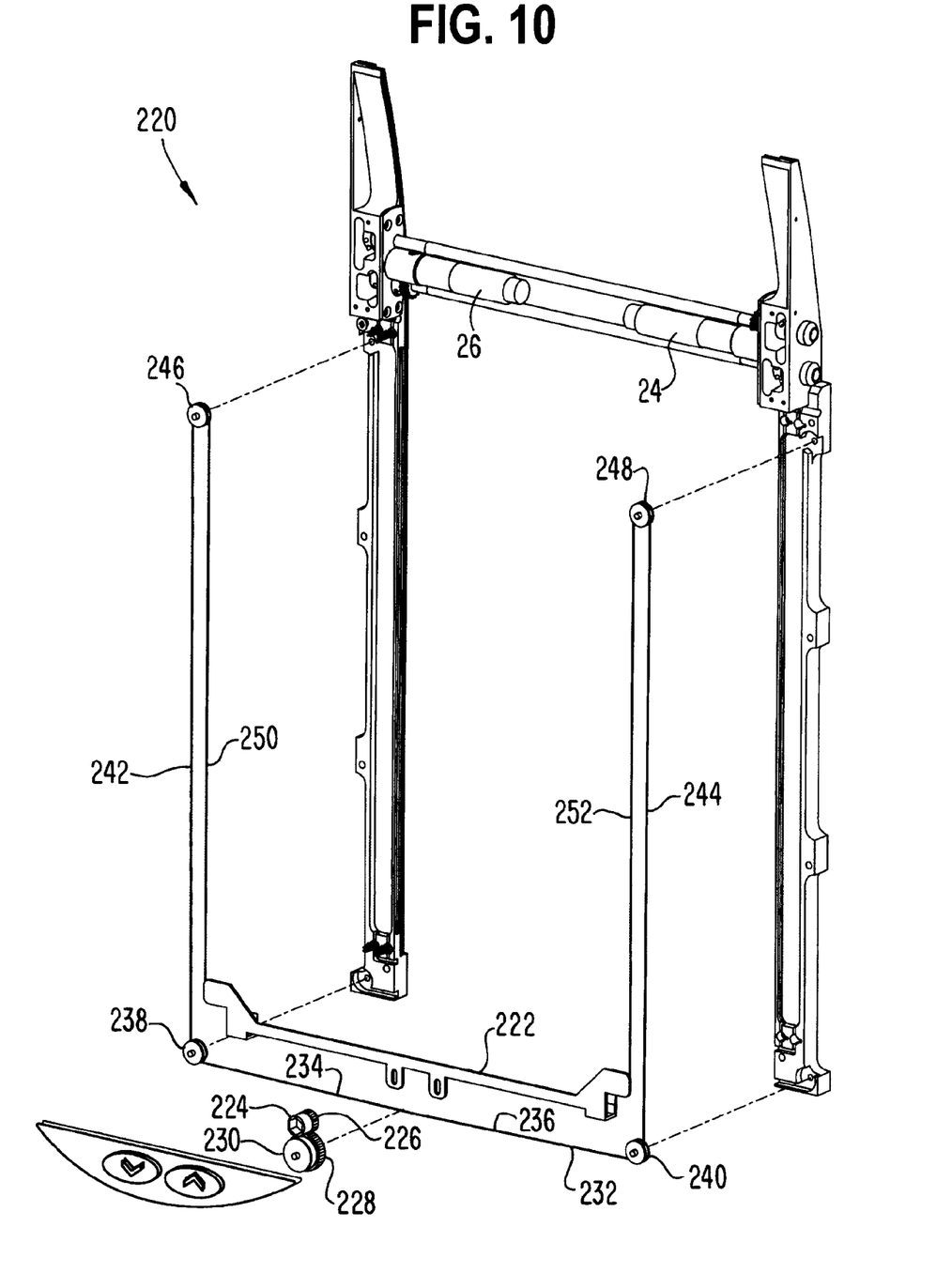
FIG. 10 is an exploded view showing the manual override mechanism of a window shade assembly.

FIG. 10 is an exploded perspective view of key components of a assembly 10 with manual override 220, in which a platform 222 is shown in a fully lowered position. The spindle 224 includes a drive gear 226, coupled to a driven gear 228 on the spool 230. Rotating the spindle 224 causes the spool 230 to draw in left and right lateral elements 234 and 236, respectively, of a pull cable 232 past left and right lower pulleys 238 and 240, respectively. The left and right descending parts 242 and 244, respectively, of the pull cable 232 pass over left and right upper pulleys 246 and 248, respectively, and the left and right rising parts 250 and 252, respectively, of the pull cable 232 attach to the platform 222. As the spindle 224 turns the spool 230, drawing in the pull cable 232, the two rising parts 250 and 252, respectively, raise the platform 222, drawing with it any shades not already at the top of travel. Peak force required to move the shades is approximately bearing, gear, and other friction loss plus the force needed to overcome the magnetic reaction torque of the unpowered motors 24 and 26, respectively, multiplied by any mechanical disadvantage and losses in using the sprocket holes in the shades to drive the motor assemblies.

The manual override in this embodiment provides at least a single, unidirectional action, which may be used to comply with typical flight regulations concerning opening all passenger cabin window shades during takeoff and landing. The expected use of the override is a pre-landing opening wherein a shade failure occurred after takeoff. In some embodiments, disassembly of the assembly 10 may be required to lower the window shades after using the override. Reversal of platform 222 motion may be possible in other embodiments using the normal, motor-driven operating mode of the assembly 10 by repeatedly turning the spindle 224 a small amount and actuating one of the motors briefly in the downward direction, or by using that motor to overdrive the override apparatus 220, provided the motor is operational and the override apparatus 220 has drag low enough not to stall the motor. Use of remote commands via CANbus to actuate a motor other than the default motor for this function may be appropriate in some embodiments.

The above description presents a assembly 10 composed of multiple separate and unique parts, such as guides/side rails, panel mounting frames, transparent panels, a cross rail, and a cover. Several of these components may be combined into a smaller number of components in some embodiments. For example, as shown in FIG. 6, the panel mounting frames 22 and 78, if merged with their respective transparent panels 18 and 20, can each form a single replaceable panel, while in that or another embodiment the two facing and/or merged panels can be made identical. Similarly, the two side rails 36 and 38 and the cross rail 80 can be combined into a single U-shaped assembly. The cover 12, likewise, can be divided into inner and outer halves and merged with the mounting frames. Since it is preferable for light blocking that the frame remain opaque and the panels remain transparent, co-molding can be used to further reduce parts count, while self-hinges can join multiple articulated elements within a molded whole.

The above description provides a window shade apparatus 10 that moves one or more shades vertically. It is to be understood that vertical shade movement with the shades moved downward to block light is preferred for some applications, and resembles the motion typical of manual window shades in many aircraft types. However, shade movement that is upward from a storage area below the window or that is horizontal may be more appropriate in some applications, and is accommodated in the inventive apparatus. It may be preferable in some embodiments to provide a serpentine or S-curve rather than a simple arcing curve near the guide rail guide shoe areas 64 and 76, respectively, in FIGS. 5 and 6, so that the orientation of the cover and the motion of the shade outside the transparent area are substantially parallel to the plane of the windows. An entirely flat shade path may be preferable in other embodiments.

In another aspect, it may be observed that the above description provides generally planar transparent panels between which are located generally straight guide rails and one or more generally planar and somewhat flexible shades. Alternative embodiments may provide a assembly in the shape of an arc of a cylindrical shell, including transparent panels that conform to the curve of the assembly assembly. Between these panels, shades can be moved that are flat and flex to conform to the curve of the assembly, or that are pre-curved to approximate the radius of the assembly, which can reduce friction. In some such embodiments, the panels and/or shades can have a cylindrical contour generally conforming to a cylindrical fuselage shape. In other such embodiments, a spherical shell section, a cone section, or other panel and/or shade contour may be preferred, where the housing contour is constrained only by the feasibility of developing at least one guide path between transparent panels within which a shade can move. Thus, the term "parallel" is used herein with respect to each geometry, such as plane, spherical, cylindrical, and the like, whereby parallel guide slots are those slots permitting a shade having a particular curvature to move freely within the slots, providing continuous light blockage when closed, withdrawing substantially fully from the window aperture when open, and urged to translate by a pair of tracked fittings positioned opposite each other proximal to an end of travel of the shade.

The straight sprocket coupling shaft shown in the figures can be flexible, or can be provided with one or more universal joints or other non-rigid torque transfer mechanisms in the shaft or within the sprockets, for embodiments such as ones in which the sprocket pair urging a shade do not rotate about a common axis. For shade motion along an arc rather than a straight path, differential sprocket sizing may be desirable, at a limit of which one or more shades may each have a single sprocket distal to a pivot. A motor per sprocket may be used in some embodiments, wherein motor synchronization may be preferred.

Drive mechanisms are described using sprockets with teeth engaging rows of holes in shades. In some embodiments, it may be desirable to provide sprocket teeth that engage the shades with recesses rather than holes in the shade, whereby there are no holes passing completely through the shades. Where the recesses require an offsetting bulge on the shade side opposite the recesses, this arrangement can require a guide slot profile that accommodates a nonuniform shape. In other embodiments, drive teeth may be integral with the shades, with mating recesses provided in the drive sprockets. Still other positive coupling drive mechanisms may be preferred, such as continuous-loop bead chains configured as drive belts, bonded to the shades, and driven by bead chain drive sprockets. In each of these configurations, as in the above-described configurations, the shades can be configured to be subjected to substantially low flexure in operation, and thus neither spooled nor fan-folded, whereby thickness and weight of the window shade mechanism are kept low and durability of the apparatus is kept high.

It is to be understood that a sprocket, as the term is used herein, may in some embodiments include a plurality of radially-protruding elements generally referred to as teeth, and may in other embodiments include alternative circumferentially distributed structures capable of receiving teeth or like protrusions. Similarly, distinctions between sprockets, gears, and other devices capable of positive coupling are substantially arbitrary, so that a gear, for example, may be applied in some embodiments in place of a sprocket. Likewise, where drive considerations so dictate, an embodiment may provide engagement elements of a drive coupling that are not coplanar, but are radially distributed on a cone or another surface that is not a plane perpendicular to an axis of rotation of the drive coupling.

As employed herein, the term "tractionable" refers to interaction between a medium, which can take the form of a shade having sprocket holes, for example, and a mechanism, such as a rotatable, toothed sprocket opposed by a guide shoe. Motion of the rotatable part of such a mechanism couples to the medium and induces motion therein. In embodiments such as that shown in FIG. 5, traction between the mechanism and medium is substantially absolute—i.e., the mechanism and medium couple motion with negligible loss and cannot experience slippage except after damage or significant dislocation of the parts. In alternative mechanism embodiments, such as drive wheels having surfaces with relatively high coefficients of friction, drive wheels having sufficiently coarse surface texture to engage a medium with a degree of traction comparable to but less than that of teeth, and the like, the coupling between a tractionable region of a medium and a traction-providing portion of a mechanism may be less than absolute, resulting in slippage, wear, position uncertainty, and other deficiencies. Media such as the toothed shade and the bead chain driven shade described above may exhibit, at the tractionable interface between the mechanism and the driven element, coupling comparable to that of a toothed sprocket driving a shade having a row of holes or recesses that mesh with sprocket teeth.

The above description presents a window shade apparatus that is positioned within the pressurized portion of an aircraft fuselage, and provides light level reduction only. In some embodiments, it may be preferable to incorporate the window shade apparatus into a pressure-carrying window assembly in an aircraft fuselage, so that the outboard transparent panel is attached and sealed to the airframe and bears a portion of the pressure differential between the cabin and the outside air, while the remainder of the shade apparatus is vented into the cabin and remains substantially free from stress due to pressure differentials and aerodynamic forces. In a similar embodiment, a assembly as described previously can omit the outboard transparent panel, and can be attached either to the aerostructure—i.e., to an exterior window assembly or other flight-load-bearing component of an aircraft—or to an interior panel. In order to establish a low dust environment in the interior of the assembly in such an embodiment, the assembly can be sealed to the aerostructure.

Although an example of the shade assembly is shown using brushless direct current (DC) motors coupled to the shafts by spur gears, it will be appreciated that other tract-based systems and rotating-shaft motor styles, such as stepper motors, alternating current (AC) motors, hollow-shaft and integral-drive-shaft motors, and linear motors, all of which may be gearless in some embodiments, can be used. Also, although the shade assembly shown is useful for large commercial aircraft, shade assemblies in the same or other sizes can also be used in smaller commercial and general aviation aircraft. The inventive concept can be applied to other window shade applications, including other forms of transportation (rail, bus, automobile, spacecraft, and the like) and static applications (windows in homes, offices, and businesses). The concept can be further applied to functions other than windows, such as apparatus to regulate sunlight levels admitted through skylights or solar heating processes, apparatus to regulate radiant heat (infrared light) or ultraviolet light flow in gas, liquid, or solid chemical processes such as polymerization, and the like. Selection of conductive, radiopaque, polarizing, or other specific shade attributes can allow the apparatus to control passage of electromagnetic energy in radio frequency and x-ray bands, for example, while use of wave plates can transform polarization of passed energy.

The many features and advantages of the invention are apparent from the detailed specification, and, thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and, accordingly, all suitable modifications and equivalents may be resorted to that fall within the scope of the invention.

What is claimed is:

1. A window shade assembly for reducing light levels and sunlight glare experienced by a passenger situated on an inboard side of the window shade assembly in an aircraft, the window shade assembly comprising:
    an inboard shade including a plurality of holes disposed along one side;
    an outboard shade including a plurality of holes disposed along one side;
    a housing, including:
        a transparent inboard panel,
        a transparent outboard panel,
        a pair of inboard guide slots to receive the inboard shade,
        a pair of outboard guide slots to receive the outboard shade, wherein the inboard and outboard shades are substantially located in the housing when disposed in a closed position, the inboard shade being located inboard of the inboard panel and the outboard shade being located between the inboard and outboard panels;
    an inboard motor, coupled to a drive gear sprocket having a cylindrical outer surface and a plurality of teeth extending radially therefrom that mesh with the plurality of holes in the inboard shade, to move the inboard shade between open and closed positions on an inboard side of the inboard panel;
    an outboard motor, coupled to a drive gear sprocket having a cylindrical outer surface and a plurality of teeth extending radially therefrom that mesh with the plurality of holes in the outboard shade, to move the outboard shade between open and closed positions between the inboard and outboard panels; and
    a cover, attached to the housing, including:
        a pair of cover inboard guide slots to receive the inboard shade, and
        a pair of cover outboard guide slots to receive the outboard shade, wherein the inboard and outboard shades are substantially located in the cover when disposed in the open position.

2. The window shade assembly of claim 1, wherein the inboard shade substantially covers the inboard panel when disposed in the closed position, and the outboard shade substantially covers the outboard panel when disposed in the closed position.

3. The window shade assembly of claim 2, wherein the inboard shade substantially reveals the inboard panel when disposed in the open position, and the outboard shade substantially reveals the outboard panel when disposed in the open position.

4. The window shade assembly of claim 1, wherein the housing includes:
    an inboard drive shaft, coupled to the inboard drive motor, attached to an additional drive gear sprocket having a cylindrical outer surface and a plurality of teeth extending radially therefrom that mesh with an additional plurality of holes in the inboard shade; and
    an outboard drive shaft, coupled to the outboard drive motor, attached to an additional drive gear sprocket having a cylindrical outer surface and a plurality of teeth extending radially therefrom that mesh with an additional plurality of holes in the outboard shade.

5. The window shade assembly of claim 4, wherein the inboard drive shaft is coupled to the inboard drive motor by an inboard pinion and an inboard driven gear, and wherein the outboard drive shaft is coupled to the outboard drive motor by an outboard pinion and an outboard driven gear.

6. The window shade assembly of claim 1, wherein the inboard and outboard shades are opaque, semi-transparent or translucent.

7. The window shade assembly of claim 1, wherein the housing includes:
    a plurality of shade position sensors;
    a control panel including at least one up button and at least one down button; and
    a microprocessor, electrically coupled to the plurality of shade position sensors, the up button, the down button, the inboard drive motor and the outboard drive motor, to control the movement of the inboard and outboard shades.

8. The window shade assembly of claim 7, wherein the housing includes a network transceiver, coupled to the microprocessor, to send and receive messages to and from a central control station over a network.

9. The window shade assembly of claim 7, wherein the housing includes:
    a left rail containing one of the inboard guide slots and one of the outboard guide slots;
    a right rail containing one of the inboard guide slots and one of the outboard guide slots;
    a cross rail to which the control panel is attached;
    an inboard plate including an aperture; and
    an outboard plate including an aperture.

10. The window shade assembly of claim 1, wherein the housing includes:
    a platform attached to the inboard and outboard shades;
    a pull cable attached to the platform through a plurality of pulleys; and
    a spindle, attached to the pull cable, to manually raise the inboard and outboard shades.

* * * * *